United States Patent Office 3,545,223
Patented Dec. 8, 1970

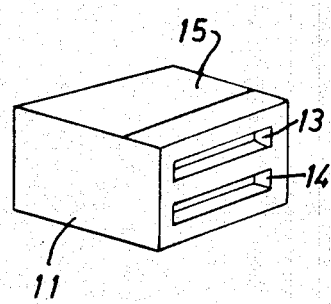
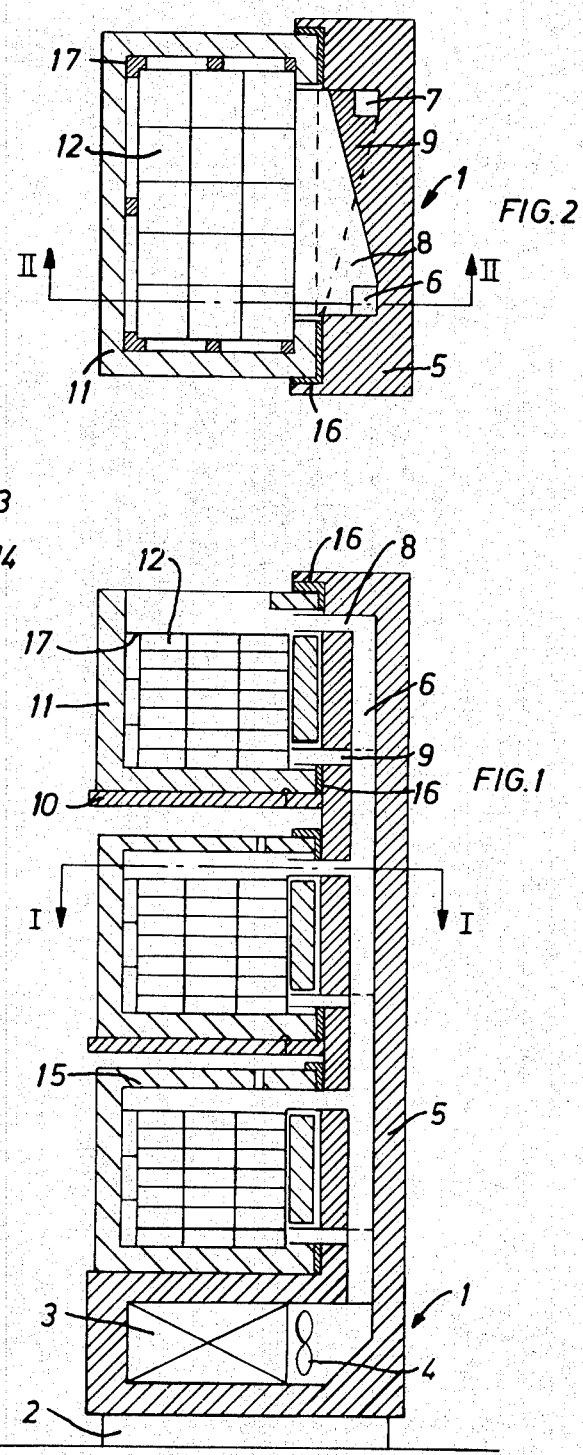

3,545,223
FREEZING PLANTS AND BOXES THEREFOR
Karl Yngve Elland, 44 Norra Vallgatan,
252 34 Halsingborg, Sweden
Filed Oct. 7, 1968, Ser. No. 765,569
Claims priority, application Sweden, Oct. 10, 1967,
13,829/67
Int. Cl. F25d 15/00
U.S. Cl. 62—237                                3 Claims

ABSTRACT OF THE DISCLOSURE

A freezing plant having a vertical wall with passages for leading cooling air from a freezing unit to a box located adjacent said wall on a horizontal support and recycling cooling air from the box to the freezing unit.

This invention relates to a freezing plant for keeping products frozen, and to a box for use with this freezing plant.

A problem inherent in previously known freezing plants and particularly freezer showcases resides in finding a suitable way of displaying to the customers the products in the freezer showcases and making them readily accessible to the customers. Usually, the freezer showcases are of low height and the customers have to bend over the rim thereof to get at and take out the product desired. Besides products of many different kinds and makes are generally stored in the same showcase and therefore it is difficult to give a certain product in the showcase particular stress to the customers. The shop assistant must unpack the products from the transport package before he can place the products in the freezer showcase, which is disadvantageous.

This problem and this disadvantage are overcome by means of a freezing plant according to the present invention, which comprises a per se known freezing unit having a fan for propulsion of cooling air, a substantially vertical wall containing at least one passage for leading away cooling air from the fan and at least one passage for recycling spent cooling air to the freezing unit and the fan, at least one substantially horizontal support for supporting a heat insulated box containing one or more frozen products and having a vertical side in proximity of said vertical wall, at least one pair of nozzles disposed on the vertical wall above said support, viz, a feed nozzle connected to the passage for leading away cooling air and a suction nozzle connected to the air recycling passage, the feed nozzle being located above the suction nozzle and said nozzles being adapted for connection to inlet and outlet openings in the box placed on said support, at least one of said openings being provided in the side wall of the box adjacent said vertical wall.

The invention also relates to a box for use in the freezing plant according to the invention and the characteristic features of said box reside in that it is made of heat insulating material and is in the shape of a parallelepipedon, that a removable cover is arranged in one side wall thereof and that two superimposed openings are provided in the box, at least one of said openings being provided in a side wall adjoining said first mentioned side wall.

For better elucidation the invention will be more fully described in the following, reference being made to the accompanying drawing which illustrates an embodiment of the invention. In the drawing:

FIG. 1 is a section on line II—II in FIG. 2 of the freezing plant and boxes for use therein;

FIG. 2 is a section on line I—I in FIG. 1;

FIG. 3 is a perspective view of a box.

The freezing plant illustrated has a frame 1 which by the intermediary of a base 2 or like part is disposed on a fundament. A freezing unit 3 with a fan 4 for propulsion of cooling air is mounted in the frame 1. Said frame has a vertical wall 5 in which there are provided a passage 6 for leading away cooling air from the fan, and a passage 7 for recycling the cooling air to the freezing unit and the fan. Three vertically spaced feed nozzles 8 extend from the passage 6 while three likewise vertically spaced suction nozzles 9 extend from the passage 7. The nozzles 8 and 9 are so arranged as to alternately open in one side of the vertical wall 5, and the feed nozzle in each pair which is formed by a feed nozzle 8 and a suction nozzle 9, is located above the suction nozzle. The nozzles 8 and 9 widen in a hopper-like manner from the respective passages 6 and 7 and are of rectangular cross sectional shape at the mouths.

Three folding brackets or supports 10 which take a horizontal position when in use are mounted on that side of the vertical wall 5 in which the nozzles 8 and 9 open. In position of use each of these brackets supports one box 11 which is heat insulated and contains frozen products 12. The box 11 is in the form of a right-angular parallelepipedon, and the box side wall which is in proximity of the vertical wall 5 when the box is placed on the bracket, has two openings 13 and 14 arranged at a distance one over the other which corresponds to the distance between the feed nozzle 8 and the suction nozzle 9 in each pair. Said openings are of a shape conforming to that of the nozzles 8 and 9. The upper opening 13 is arranged for connection to the feed nozzle 8 while the lower opening 14 is arranged for connection to the suction nozzle 9. At the top the box 11 has a removable cover 15 to make the products accessible to the customers.

Within the range of each box 11 the vertical wall 5 is equipped with gaskets 16, preferably of rubber, to prevent leakage of air outwardly of the box on the bracket 10 along the vertical wall to and from the nozzles 8, 9, respectively.

When no box 11 is placed on the bracket 10 the latter is folded upwardly to cover the nozzles 8, 9 whereby escape of cooling air into the premises is prevented. To provide efficient sealing of the nozzles the bracket in the upwardly folded position thereof bears against the gaskets 16.

In order that cooling air may flow unimpededly through the box 11 on its way from the feed nozzle 8 to the suction nozzle 9 spacers 17 are arranged between the inner walls of the box and the frozen products 12, with the exception of the inner wall between the nozzles 8, 9. By this arrangement the cooling air will be forced to sweep around the products thus keeping them frozen.

The freezing plant described and shown operates in the following manner. When the boxes 11 are placed on the respective brackets 10 and the openings 13, 14 are connected to the respective nozzles, cooling air flows from the freezing unit 3 through the passage 6 and by the intermediary of the feed nozzle 8 into the box 11. In the box the cooling air sweeps around the products to keep them frozen, and then the cooling air is sucked out of the box by means of the suction nozzle 9 and is introduced into the passage 7 leading to the freezing unit 3 in order to be chilled again. This cycling of cooling air and spent cooling air proceeds continuously. When all products have been taken out of a box, the latter is removed from the bracket 10, whereupon either a new box is placed in position or the bracket is folded upwardly into application with the nozzles 8, 9 to cover them and prevent leakage of cooling air into the premises. When the boxes are superimposed in the manner shown in FIG. 1 the cover 15 of the uppermost box only is removed to make the products therein accessible while the boxes beneath said first mentioned box remain sealed until they are to be used.

Of course, the freezing plant according to the invention can also be built so as to extend in the horizontal direction whereby the boxes will come to lie juxtaposed, or in such a way that boxes can be arranged both above and laterally of each other.

The feed nozzle can also be made to extend above the box 11 and arranged with its mouth adjacent the opening of the box, whereby but one opening 14 need be made in the side wall of the box adjacent the vertical wall 5.

What I claim and desire to secure by Letters Patent is:

1. A refrigerated case for frozen products, comprising a base structure and an upright structure having a substantially vertical wall, air cooling means and air moving means in said case, said upright structure having a supply passage for conducting cooling air from said cooling means and a return passage for recycling spent cooling air to said air cooling means, a substantially horizontal shelf mounted on said upright structure for supporting a box containing frozen products in a position in which the box has a substantially vertical side disposed adjacent to said vertical wall on said upright structure, said vertical side in said box having an inlet opening and an outlet opening, a supply and return nozzle on said vertical wall above said shelf connected respectively to said supply and return passages, said supply and return nozzles being adapted to be connected to said inlet and outlet openings in said box for supplying and returning cool air to and from said box, and means for mounting said shelf for pivotal movement from said horizontal box-supporting position to an upwardly directed position along said upright vertical wall for covering said nozzles after said box has been removed from said shelf.

2. A refrigerated case according to claim 1 comprising gasket means on said vertical wall adapted to engage said box when the latter is placed on said shelf to prevent air leakage from between said upright vertical wall and said vertical side of said box.

3. A refrigerated case according to claim 2 wherein said shelf and gasket means are constructed and arranged such that said shelf engages said gasket means when the shelf is pivoted to said upwardly directed position.

References Cited

UNITED STATES PATENTS

| | | | |
|---|---|---|---|
| 2,915,884 | 12/1959 | Haushalter | 62—237 |
| 3,166,916 | 1/1965 | Burrows | 62—237 |
| 3,392,543 | 7/1968 | Miller | 62—237 |

WILLIAM I. WYE, Primary Examiner

U.S. Cl. X.R.

62—256, 265, 419; 98—36